(12) United States Patent
Straus et al.

(10) Patent No.: US 6,516,974 B2
(45) Date of Patent: Feb. 11, 2003

(54) APPARATUS AND METHOD FOR DISPENSING CANDY

(76) Inventors: Adam Straus, 26 Palmer Ave., North Tarrytown, NY (US) 10591; Roberta Straus, 26 Palmer Ave., North Tarrytown, NY (US) 10591

( * ) Notice: Subject to any disclaimer, the term of this patent is extended or adjusted under 35 U.S.C. 154(b) by 0 days.

(21) Appl. No.: 09/741,359

(22) Filed: Dec. 19, 2000

(65) Prior Publication Data

US 2002/0074358 A1 Jun. 20, 2002

(51) Int. Cl.[7] .............................................. B65D 83/76
(52) U.S. Cl. ................ 222/195; 222/321.9; 222/383.1; 222/385; 222/1
(58) Field of Search .......................... 222/1, 195, 320, 222/321.1, 321.5, 321.6, 321.7, 321.8, 321.9, 383.1, 383.3, 384–387

(56) References Cited

U.S. PATENT DOCUMENTS

| 3,915,345 A | * | 10/1975 | Harrison et al. ............ 222/136 |
| 4,104,412 A | | 8/1978 | Fischer et al. |
| 4,993,599 A | * | 2/1991 | Gruenewald ................. 222/195 |
| 5,030,469 A | | 7/1991 | Mergelsberg |
| 5,048,724 A | | 9/1991 | Thomas |
| 5,165,951 A | | 11/1992 | Gallart et al. |
| 5,208,050 A | * | 5/1993 | Ney ............................ 222/386 |
| 5,439,698 A | | 8/1995 | Ahn et al. |
| 5,523,106 A | | 6/1996 | Gimmler et al. |
| 5,827,505 A | | 10/1998 | Hughes et al. |
| 5,839,616 A | * | 11/1998 | Irwin et al. ............... 222/321.8 |
| 5,853,785 A | * | 12/1998 | Nayyar et al. ............... 426/565 |
| 6,004,538 A | | 12/1999 | Hughes et al. |
| 6,142,338 A | * | 11/2000 | Pellicano .................. 222/321.7 |

* cited by examiner

Primary Examiner—J. Casimer Jacyna
(74) Attorney, Agent, or Firm—Keusey, Tutunjian & Bitetto, P.C.

(57) ABSTRACT

An edible foam dispenser, in accordance with the present invention, includes a reservoir forming a cavity, and a liquid including a foaming agent stored in the cavity. A flow device has an inlet coupled to the reservoir and causes the liquid to flow from an outlet of the flow device. An aeration device is connected to the output of the flow device for gasifying the liquid to form an edible foam, preferably a candy foam. A method for dispensing a candy foam is also disclosed.

31 Claims, 6 Drawing Sheets

APPARATUS AND METHOD FOR DISPENSING CANDY

BACKGROUND

1. Technical Field

This disclosure relates to an apparatus and method for dispensing an edible foam, and more particularly, to a liquid composition which is dispensed by aerating the composition to form an edible foam.

2. Description of the Related Art

Confectioneries, such as, for example, whipped cream, are packaged in pressurized containers or cans. The containers, which include the confectionery products, function as a pressure vessel with the contents therein being pressurized by a gas, such as, for example, nitrous oxide. When the pressure is released, for example, at a dispensing nozzle the confectionery along with the pressurized gas are released from the container. These pressurized containers may be dangerous in situations where elevated temperatures are present or in the event that the container is punctured. As such, these type of products are not suitable for use by children.

In other art, solid candy has been gasified to achieve products having a lower density. Inert gas is typically added to a liquefied candy during processing. When the candy is solidified bubbles are formed in the candy matrix (e.g., solid foam) to increase volume of the candy to lower cost with respect to volume. Some examples of this gasification process are disclosed by Gallart et al. in U.S. Pat. No. 5,165,951, Ahn et al. in U.S. Pat. No. 5,439,698, etc.

SUMMARY OF THE INVENTION

The present invention includes edible foam dispensers and a method for dispensing candy by gasifying a liquid to form an edible foam. A edible foam, in accordance with the present invention, includes a reservoir forming a cavity. A liquid is included with a foaming agent and stored in the cavity. A flow device has an inlet coupled to the reservoir. The flow device causes the liquid to flow from the inlet to an outlet of the flow device. An aeration device is connected to the output of the flow device, and the liquid is introduced to the aeration device for gasifying the liquid candy to form an edible foam. The liquid may include a liquid candy, food, beverage or other edible form.

A candy dispenser for dispensing an edible foam, in accordance with the invention, includes a reservoir forming a cavity, and a liquid candy stored in the cavity and including a foaming agent. A pump assembly is provided with a piston and cylinder arrangement for drawing the liquid candy into an inlet coupled to the reservoir and causing the liquid candy to flow from an outlet of the pump assembly. An aeration device is connected to the output of the pump assembly. The aeration device introduces air into the liquid candy at the outlet of the pump assembly to form an edible foam. A nozzle is mounted on the aeration device for dispensing the foam.

In other embodiments, the flow device may include a piston disposed in a cylinder such that liquid is drawn into the inlet by a first displacement of the piston, and a second displacement of the piston forces the liquid from the outlet. The flow device may include a tube and the reservoir may include a flexible gland. The flexible gland may include a first volume such that when the first volume is reduced the liquid candy flows from the outlet. The aeration device may include a restriction of the outlet. The restriction may include a mesh or a plurality of holes. The foaming agent may include at least one of yucca and quillaja. The liquid may include one of a plurality of colors and one of a plurality of flavors. 12. The piston and cylinder arrangement may include a first displacement of the piston to draw the liquid in the inlet. A second displacement of the piston would than force the liquid from the outlet. The dispenser may further include a crank, a finger pump, a flexible reservoir, a Venturi siphon, etc. for providing displacement of the pump assembly for causing the liquid candy to flow.

A method for dispensing an edible foam, in accordance with the present invention, includes the steps of providing a liquid including a foaming agent in liquid form in a container, generating a flow of the liquid from the container, agitating the liquid to form a foam and dispensing the foam.

In other methods, the step of generating a flow may include the step of pumping the liquid through a tube. The step of agitating the liquid to form a foam may include the step of flowing the liquid through a mesh to aerate the liquid to form the foam. The method may include the step of eating the foam. The step of maintaining the liquid candy at atmospheric pressure may be included. The liquid preferably includes liquid candy. The step of providing a liquid including a foaming agent in a container in liquid form may include the steps of providing the liquid in a solid form, reducing the solid form to a liquid.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides a novel apparatus and method for dispensing a an edible foam, e.g., liquid candy in the form of a foam. A container or reservoir is provided for holding a liquid candy. The liquid candy is preferably maintained at room temperature and at atmospheric pressure. An aeration device is provided for aerating the liquid candy into a foam and dispensing the foam through a nozzle or orifice to be consumed by a person. The present invention will now be described in terms of a liquid candy, however it is contemplated the liquid substance may include other food or beverage material, which is dispensed as a foam. The present invention will now be described in greater detail with reference to illustrative embodiments. These illustrative embodiments should not be construed as limiting the present invention, as the present invention may be adapted by those skilled in the art in light of the present specification.

Figure 1:
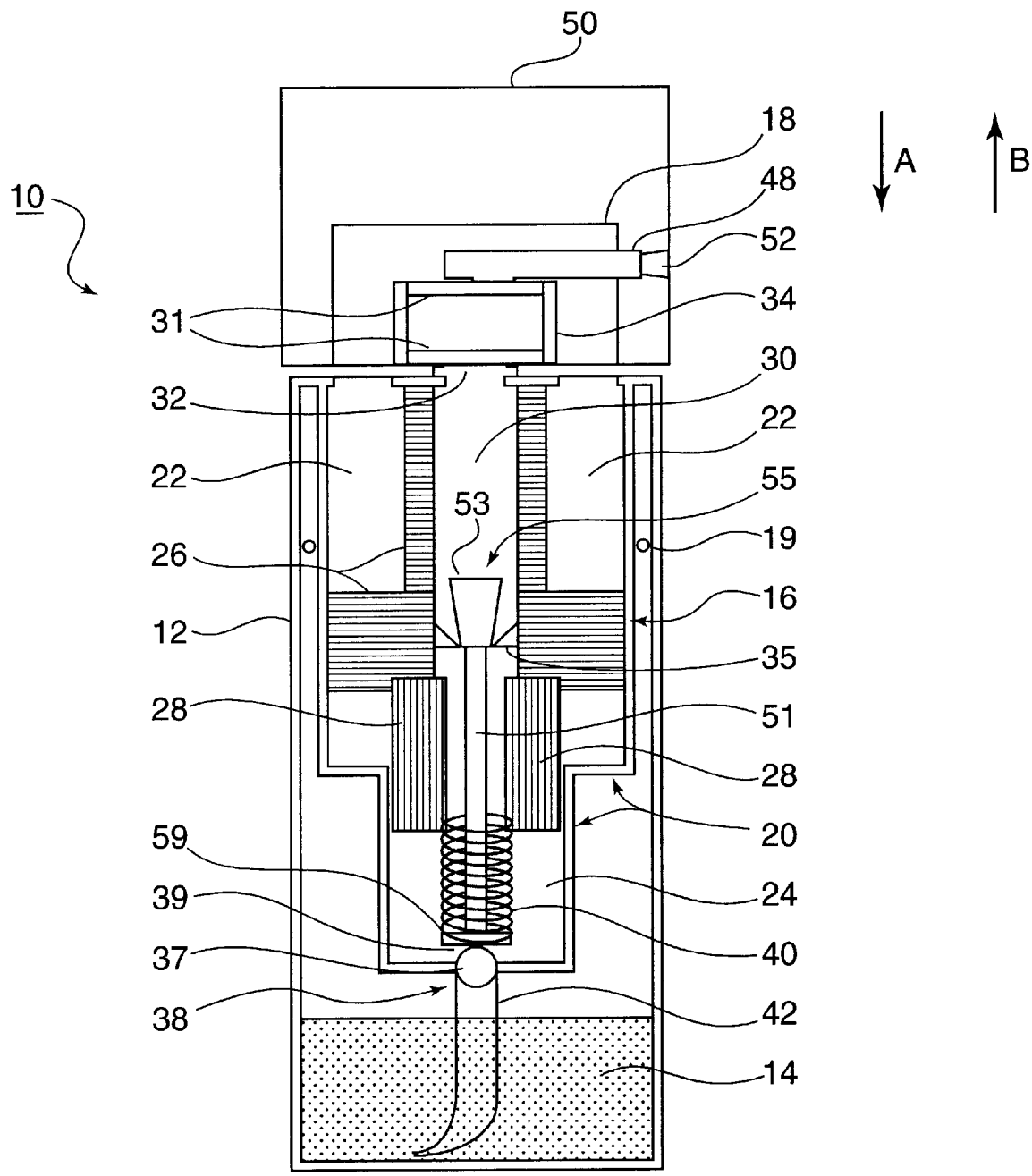
FIG. 1 is a cross-sectional view of one embodiment of a candy dispensing apparatus in accordance with the present invention.

Referring now in specific detail to the drawings in which like reference numerals identify similar or identical elements throughout the several views, and initially to FIG. 1, a illustrative dispensing apparatus or delivery system 10 is shown in accordance with one embodiment of the present invention. Dispensing apparatus 10 includes a reservoir or container 12. Reservoir 12 is preferably formed from a translucent material, for example, a plastic, to reveal the contents of reservoir 12. In other embodiments, container 12 may include colored opaque or translucent materials. Reservoir 12 may be formed in a plurality of shapes and sizes. For example, reservoir 12 may be shaped in the form of a notorious cartoon character, in the shape of a toy gun, etc.

Reservoir 12 stores a confectionery liquid 14. Liquid 14 preferably includes water. Liquid 14 may include a composition including a sweetener, such as sugar or sugar substitute, corn syrup, etc. Liquid 14 includes a foaming agent, such as, for example, quillaja or yucca, other edible foaming agents may also be employed. Liquid 14 may include a plurality of different flavors and/or colors. For example, natural or artificial flavors or colors may be introduced in liquid 14. In one embodiment, liquid 14 may begin in a solid form or a powdered solid form. The solid may be heated or otherwise reduced (powder combined with a liquid, such as, water) to create a liquid form. The liquid form (liquid 14) may then be dispensed in accordance with the invention.

A pump assembly 16 is provided which mounts on reservoir 12. Pump assembly 16 is attached to reservoir 12, for example be employing a threaded or snap-on arrangement. A seal 19 may be employed between reservoir 12 and pump assembly 16. In the embodiment shown in FIG. 1, pump assembly 16 provides a flow device, which includes a piston and cylinder arrangement. Other types of flow devices may also be employed, for example, propellers or other devices, which can create a flow by creating a pressure differential. To take advantage of both a downward and upward stroke of a nozzle cap 18, a cylinder 20 is included forming concentric bores 22 and 24. A first bore 22 is dimensioned and configured to receive a piston 26 for liquid and a second bore 24 is dimensioned and configured to receive a piston 28. Pistons 26 and 28 are connected to each other and piston 26 is connected to nozzle cap 18. When nozzle cap 18 is depressed by a user, nozzle cap 18 and pistons 26 and 28 move in unison downward into bores 22 and 24 of cylinder 20. Piston 26 moves in bore or cylinder 22 causing a volume increase above piston 26 and a volume decrease below piston 26 to drive liquid 14 through a center tube 30 formed through pistons 24 and 26. At the same time, liquid 14 (which was previously drawn into bore or cylinder 24) undergoes a decrease in volume also to force liquid 14 through center tube 30. Center tube 30 includes an outlet 32, which is located beyond piston 28, such that the pumping action of pistons 26 and 28 provides liquid 14 at outlet 32. A one-way valve 38 is provided at an inlet 39 to cylinder 22.

Valve 38 may include a ball 37 or other device which permits liquid to flow into cylinder 22 from reservoir through a siphon or dip tube 42, but prevents flow back into reservoir 12 when nozzle 18 and pistons 26 and 28 are depressed.

Outlet 32 may include an aeration device 34, which includes a restriction 31 for aerating liquid 14. Restriction 31 may include a plurality of holes, a mesh or a plurality of meshes through which liquid 14 is forced by the pumping action of pistons 26 and 28. Aeration occurs during the agitation of liquid 14 in restriction 31. Due to the presence of a foaming agent in liquid 14, the agitation causes a foam to be dispensed through nozzle cap 18. An edible foam is delivered to be consumed by a person.

Upon releasing nozzle cap 18, a return action is provided by a biasing device 40. Biasing device 40 may include, for example, a spring or an elastic material to restore nozzle cap 18 and pistons 26 and 28 to a first position. Biasing device 40 is captured between piston 28 and an end portion 59 or a rod 51. Biasing device 40 maintains valve 38 in a sealed position to prevent backflow of liquid 14 into reservoir 12 when liquid 14 is being drawn through center tube 30 to be gasified or aerated (e.g., when nozzle 18, and pistons 26 and 28 are moved down in the direction of arrow "A"). The return action of nozzle 18 and pistons 26 and 28 in the direction of arrow "B", provided by biasing device 40, causes value 38 to open and draws liquid 14 into cylinder 24 from reservoir 12. This liquid in cylinder 24 will be converted to foam in a successive depression of nozzle cap 18. A valve 55 includes rod 51, which is disposed in center tube 30. Rod 51 includes a sealing end portion 53. Sealing end portion 53 provides a seal when nozzle cap 18 and pistons 26 and 28 are released (to draw liquid into cylinder 24) but is opened to permit flow when nozzle cap 18 and pistons 26 and 28 are depressed. Rod 51 may be biased by biasing device 40 to ensure a seal is provided. A surface 35 is provided, which is attached in center tube 30 to provide a sealing surface for sealing end 53.

Nozzle cap 18 is preferably adapted to be pumped by a finger, and includes an orifice 48 for delivering foam candy in accordance with the invention. A cap 50 and/or a stopper 52 may be employed to prevent dispensing of foam when apparatus 10 is not in use. It is to be understood that the components of apparatus 10 preferably include plastic parts, which may be translucent or opaque and may include a single or a plurality of different colors. Other materials may also be employed and are contemplated. In addition, relief valves or holes may be provided in pistons or other devices to provide proper operation of apparatus 10, as would be understood by one skilled in the art.

Figure 2:
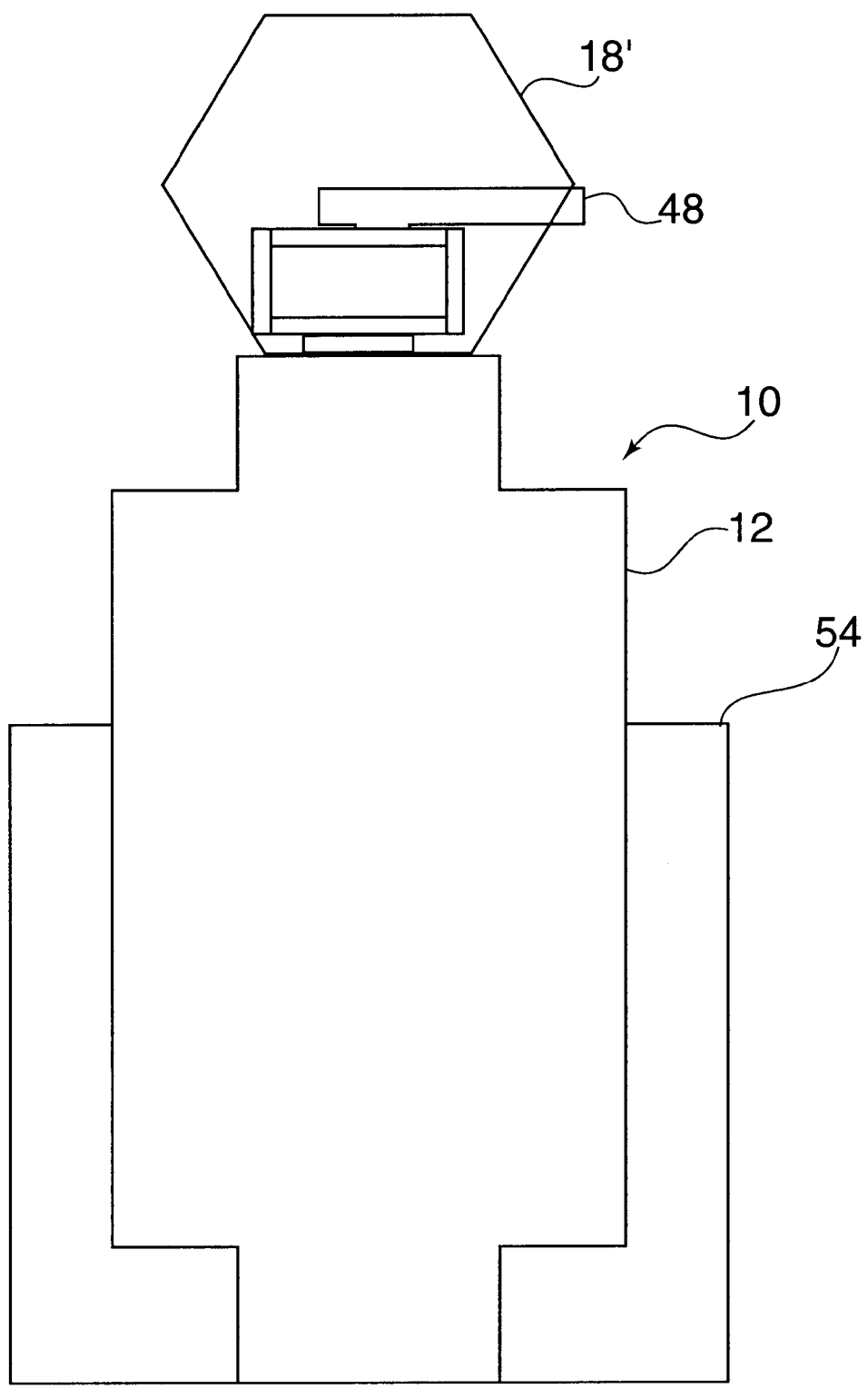
FIG. 2 is a partial cross-sectional view of another embodiment of the candy dispensing apparatus of the present invention.

Referring to FIG. 2, in other embodiments, nozzle cap 18' may include molded plastic and may further include different shapes or features. For example, nozzle cap 18' may be formed as a likeness of a famous or fictitious character with the foam being ejected from a mouth of the character. Other types of nozzle caps are also contemplated. In still other embodiments, reservoir 12 may be shaped as a likeness of a famous or fictitious character or any other form. Alternately, an additional sleeve 54 may be included into which reservoir 12 is inserted. Sleeve 54 may include for example, a likeness of a famous, character, a fictitious character or any other form. In another example, reservoir 12 may be shaped like a toy gun with foam being dispensed from a barrel of the toy gun. A trigger of the toy gun may be employed to pump the foam candy from the barrel.

Figure 3:
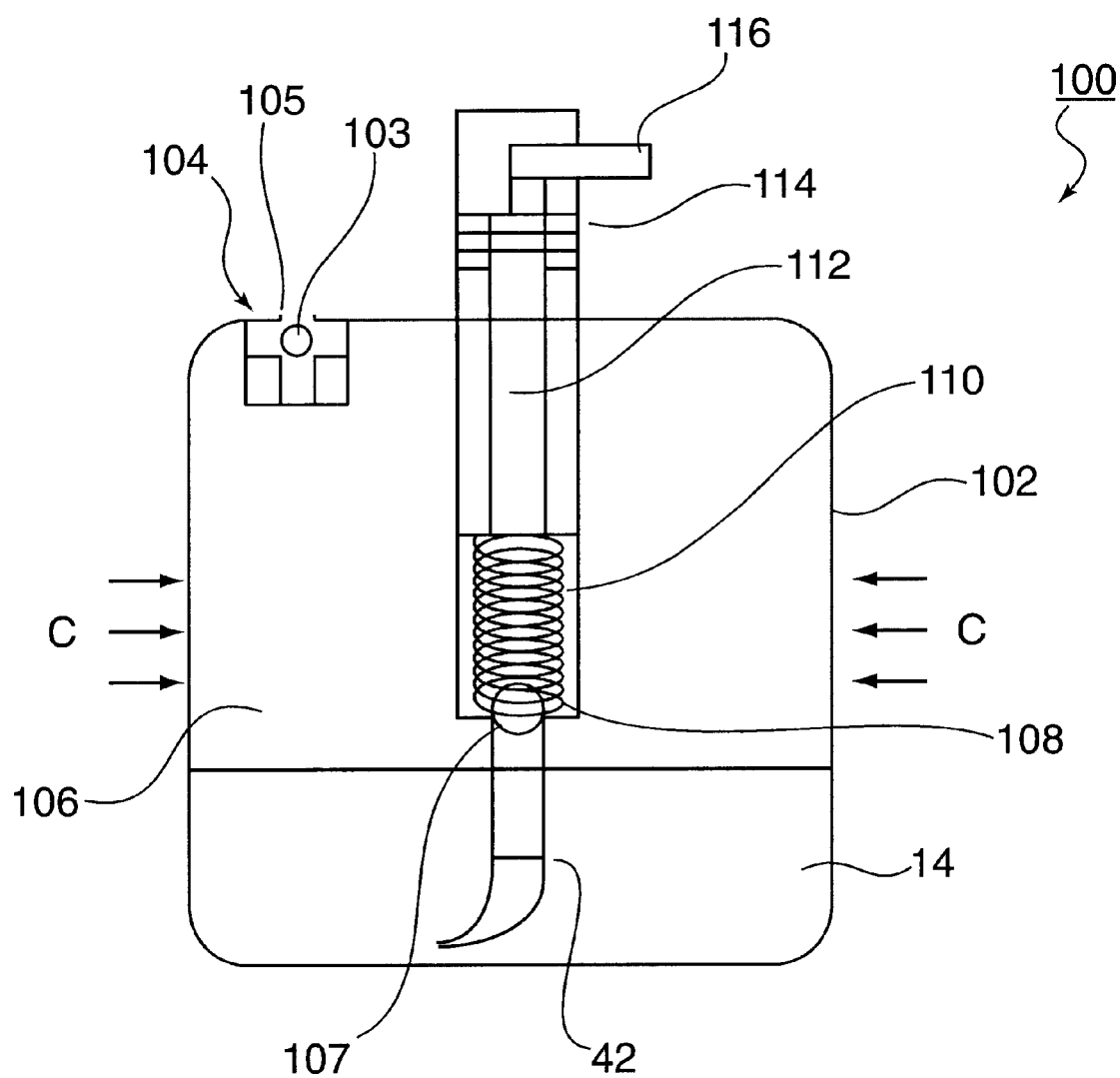
FIG. 3 is a cross-sectional view of another embodiment of the candy dispensing apparatus of the present invention showing a flexible gland for causing liquid candy to flow and be converted into a foam.

Referring now to FIG. 3, an alternate embodiment of the present invention is shown. An apparatus 100, in accordance with the present invention, includes a resilient flexible, gland portion 102, which functions as a reservoir for liquid 14. A one way valve 104 is attached in communication with an inner cavity 106. One way valve 104 may include a biased cone or ball 103, which seals an opening 105 when gland portion 102 is squeezed, but is permitted to open hole 105 as gland portion 102 is released (and expands back to its original volume). This permits air to replace the volume of inner cavity 106.

When gland portion 102 is squeezed (in the direction of arrows "C"), liquid 14 is permitted to pass through another one-way valve 108 into a tube 112. Tube 112 includes a restriction 114 such as a plurality of holes or a mesh. Restriction 114 agitates liquid 14 to cause aeration of liquid 14 such that foam is formed which is ejected from a nozzle 116.

Valve 108 may include, for example, a ball 107, which is biased into a top portion of dip tube 42 by a bias device 110. Valve 108 is opened to permit liquid 14 into tube 112 when gland portion 102 is squeezed or otherwise volumetrically restricted or pressurized. Valve 108 is closed when gland portion 102 is released (and volume of gland portion 102 recovers). When valve 108 is closed, air is prevented from entering inner cavity 106 through tube 112. In this way, by squeezing gland portion 102, a foam is delivered from nozzle 116. Gland portion 102 is formed from a resilient plastic material, for example, a blow molded plastic, which will recover its original shape when air is introduced through valve 104.

Gland portion 102 may be formed into a plurality of different shapes, colors or textures. For example, gland portion 102 may be formed as a likeness of a famous or fictitious character. In another example, gland portion 102 may be shaped like a toy gun with foam being dispensed from a barrel of the toy gun (e.g., nozzle 116).

The present invention may be implemented in a plurality of different configurations. For example, stored compressed gas may be employed to force liquid 14 through a restriction to provide aeration. The compressed air may be generated by, for example, a pump or similar device at the time when foam is to be dispensed by.

Figure 4:
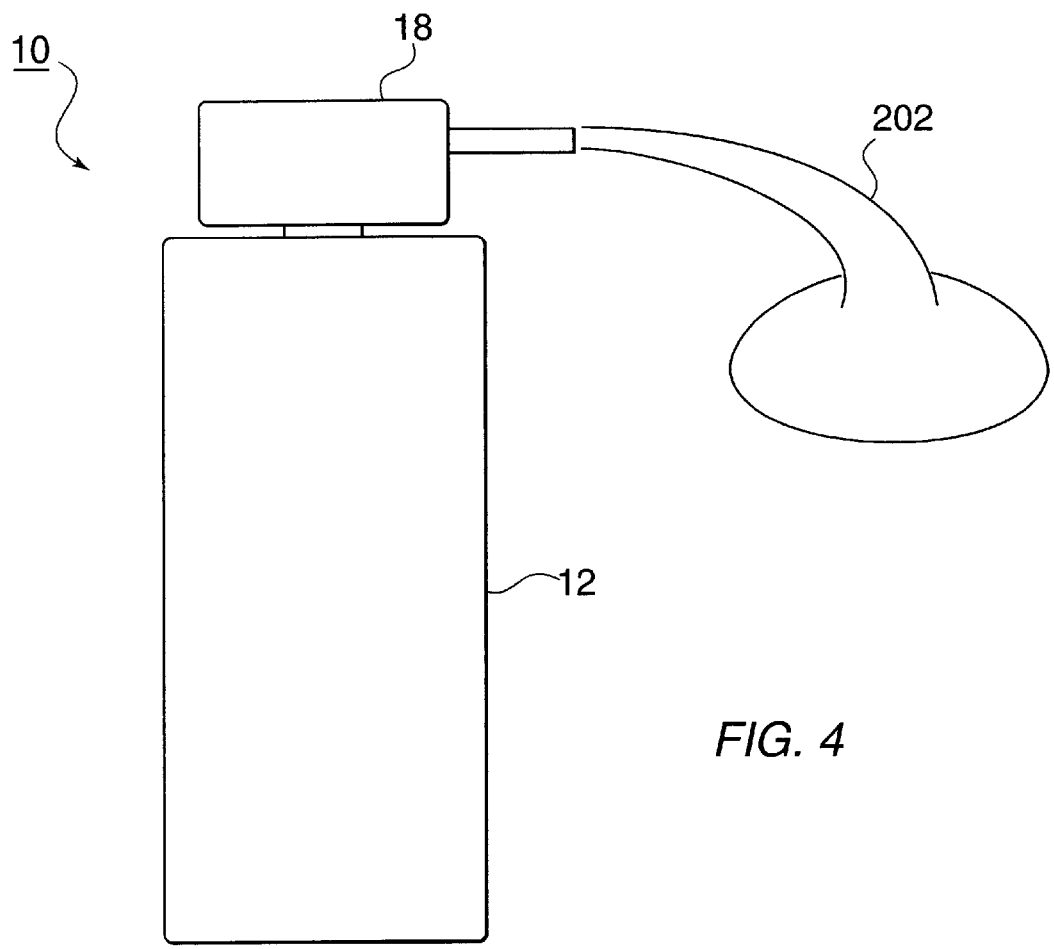
FIG. 4 is a side view of the candy dispensing apparatus of the present invention dispensing edible foam.

Referring to FIG. 4, an edible foam 202 is dispensed from a nozzle 204 of apparatus 10. Foam 202 is provided by the gasification of a liquid 14. Advantageously, gasification of liquid 14 is preferably provided by an aeration process. Liquid 14 is preferably maintained at about room temperature and at about atmospheric pressure. In a preferred embodiment, a finger actuated pump is employed to draw or force liquid 14 through a restriction of other aeration device. In FIG. 4, pumping is provided by moving a nozzle cap up and down to first draw liquid from reservoir 12 and then simultaneously aerate and deliver foam 202 to a user 206. (see e.g., FIG. 1). It is contemplated that foam 202 may be delivered directly to the mouth or may be delivered to a hand of user 206 to be eaten. Apparatus 10 is preferably dimensioned and configured to be a hand-held dispenser. In addition, reservoirs are configured to be refillable with liquid 14.

In preferred embodiments, foam 202 includes a foaming agent such as yucca or quillaja in an amount of about two U.S. ounces for ever 25 U.S. gallons of liquid solution or a ratio of about 1 part foaming agent to 1000 parts liquid solution. Other ratios may also be employed. In one embodiment, liquid 14 may include a liquid candy, food, beverage or other edible form.

Other compositions are also contemplated. Liquid 14 may be provided in a plurality of flavors, for example, grape flavor, cherry flavor, etc. and in a plurality of colors, for example, purple, red, etc.

Figure 5:
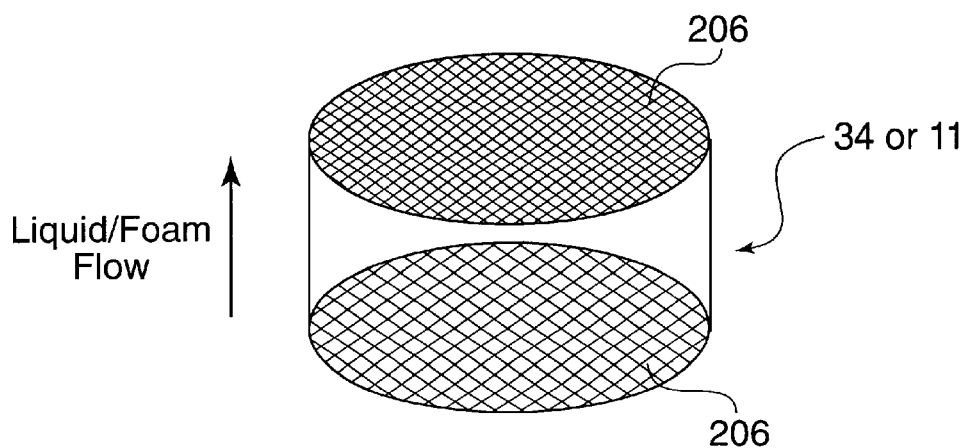
FIG. 5 is a perspective view of an illustrative aeration device, which may be employed in accordance with the present invention.

Referring to FIG. 5, an aeration device is illustratively shown. Aeration device 34 or 114 includes a mesh or a plurality of openings 206 through which liquid 14 is drawn. In a preferred embodiment, multiple meshes are employed which have progressively smaller holes as the foaming of liquid 14 proceeds. As liquid 14 is drawn through mesh 206, liquid 14 expands into a foam, which continues to have liquid properties. In another embodiment, additives may be employed to cause the foam to harden over time.

Figure 6:
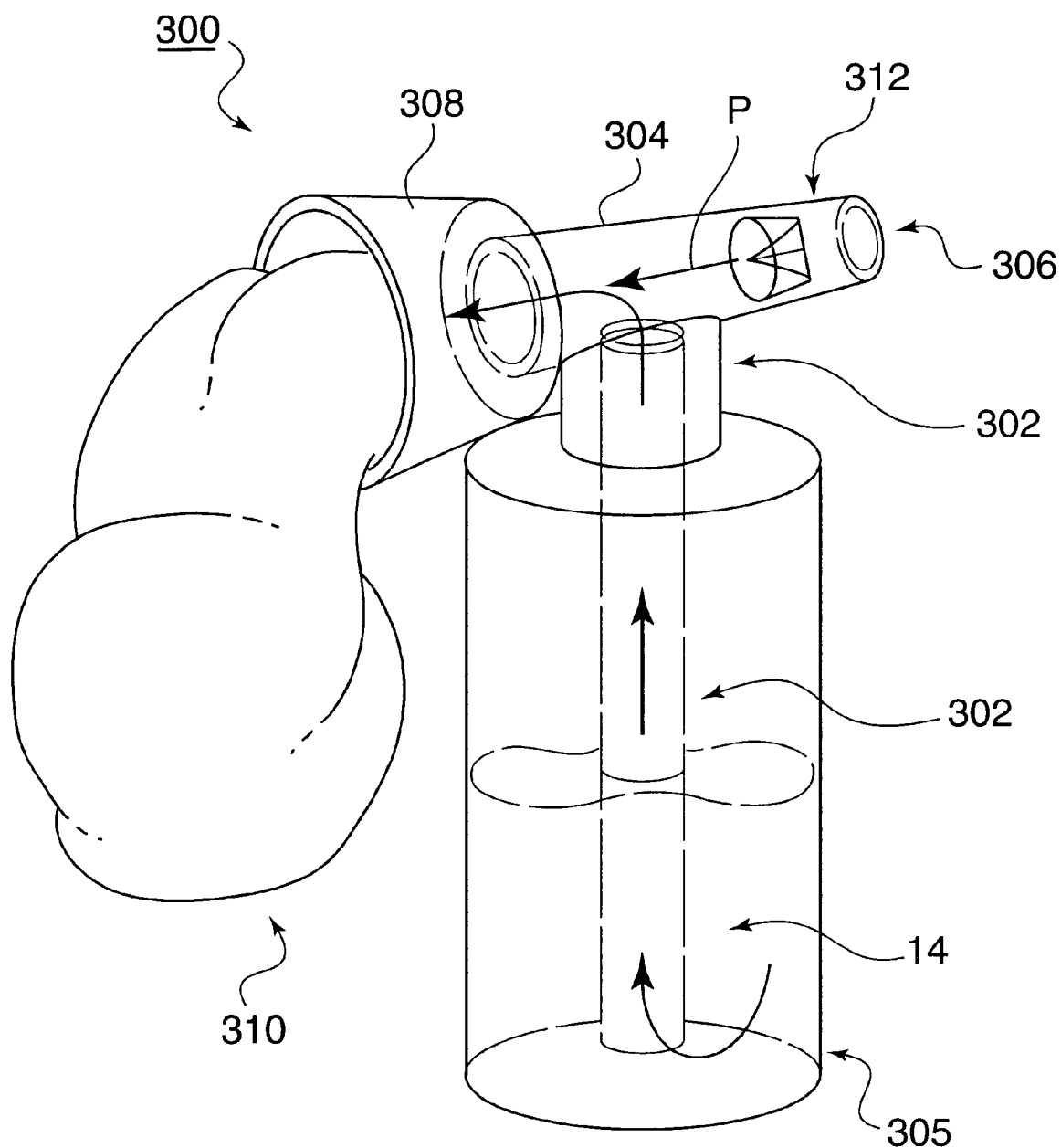
FIG. 6 is a perspective view of a Venturi siphon dispensing device in accordance with another embodiment of the present invention.

Referring to FIG. 6, another delivery system is shown for dispensing an edible foam. Delivery system 300 includes a Venturi siphon 302 attached to a nozzle 304. Nozzle 304 includes a mouthpiece or gas inlet 306 into which gas is caused to flow. Flow of gas in the direction of arrow "P" through nozzle 304 draws liquid 14 from container 305 into Venturi siphon 302 and out of an aeration device 308. Aeration device 308 may include the mesh system as shown in FIG. 5. Liquid 14 is aerated causing a foam 310 to be dispensed in accordance with the present invention. In a preferred embodiment, a check valve 312 is provided near gas inlet 306 to permit air to be injected into nozzle 304 and not sucked out from nozzle 304.

Figure 7:
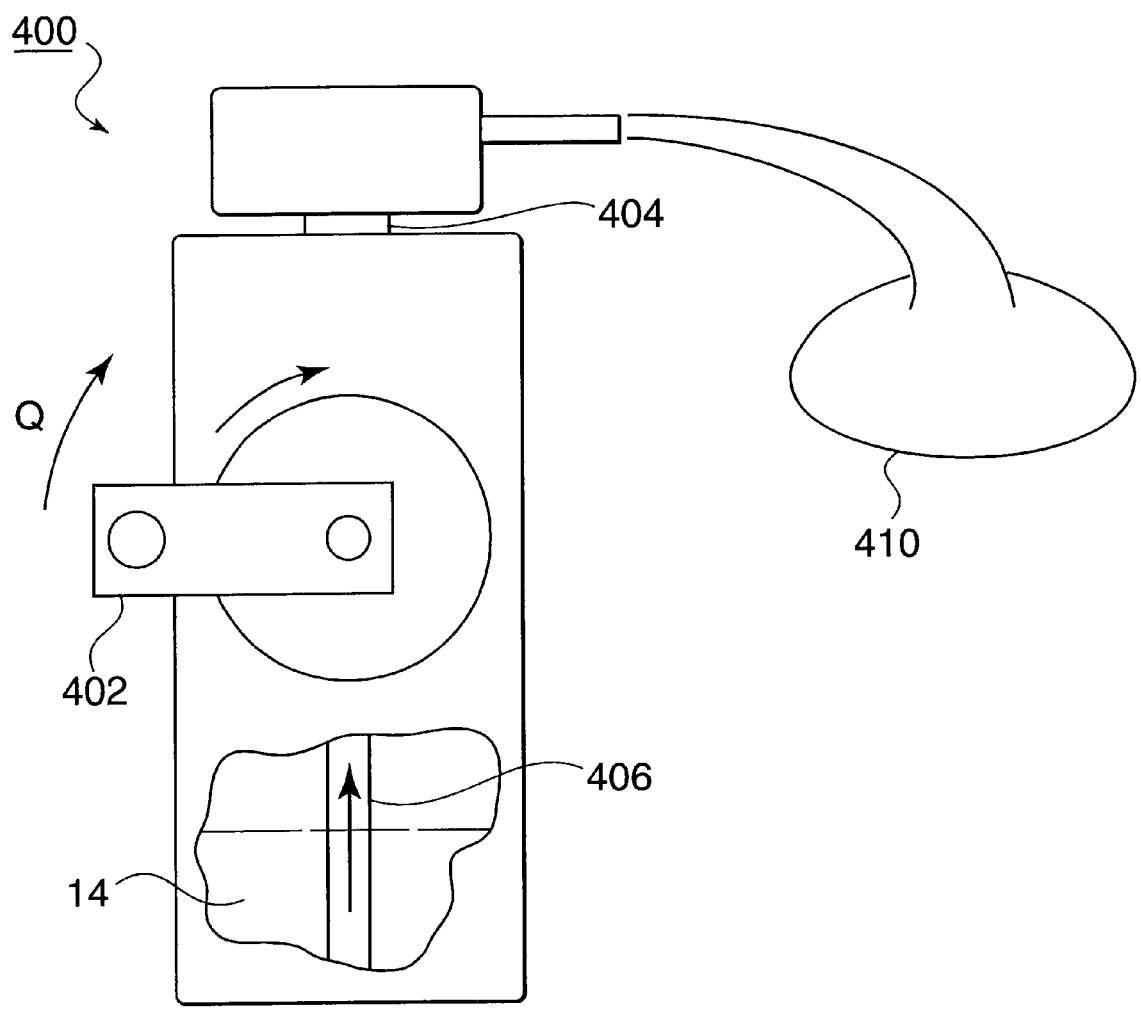
FIG. 7 is a side view showing a crank mechanism for pumping edible foam in accordance with another embodiment of the present invention.

Referring to FIG. 7, a dispensing system 400 is shown in accordance with yet another embodiment of the present invention. A crank handle 402 is provided to replace the finger pump of FIG. 1. Turning crank handle 402 in the direction of arrow "Q" causes piston displacement to draw liquid 14 into a flow tube 406 and then eject liquid 14 through an aeration device 404 (see e.g., FIG. 5) to create an edible foam 410.

Having described preferred embodiments for apparatus and method for dispensing candy (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A non-aerosol edible foam dispenser, comprising:
   a reservoir forming a cavity;
   an edible liquid including a foaming agent stored in the cavity;
   a flow device having an inlet coupled to the reservoir, the flow device for causing the edible liquid to flow from an outlet of the flow device; and
   an aeration device connected to the outlet of the flow device, the aeration device for gasifying the edible liquid to form an edible foam.

2. The edible foam dispenser as recited in claim 1, wherein the flow device includes a piston disposed in a cylinder such that liquid is drawn into the inlet by a first displacement of the piston.

3. The edible foam dispenser as recited in claim 2, wherein a second displacement of the piston forces the liquid from the outlet.

4. The edible foam dispenser as recited in claim 1, wherein the flow device includes a tube and the reservoir includes a flexible gland, the flexible gland including a first volume such that when the first volume is reduced the liquid flows from the outlet.

5. The edible foam as recited in claim 1, wherein the aeration device includes a restriction of the outlet.

6. The edible foam as recited in claim 5, wherein the restriction includes at least one mesh.

7. The edible foam as recited in claim 1, wherein the foaming agent includes at least one of yucca and quillaja.

8. The non-aerosol edible foam dispenser as recited in claim 1, wherein the edible liquid includes one of a plurality of colors and one of a plurality of flavors.

9. The edible foam dispenser as recited in claim 1, wherein the flow device includes a Venturi siphon.

10. The edible foam dispenser as recited in claim 1, wherein the liquid includes liquid candy and the edible foam includes candy foam.

11. The dispenser of claim 1, wherein the edible liquid is provided in solid form, and reduced to form the edible liquid.

12. The dispenser of claim 1, wherein the edible liquid is maintained at atmospheric pressure.

13. A non-aerosol candy dispenser for dispensing an edible foam, comprising:
    a reservoir forming a cavity;
    a liquid candy including a foaming agent stored in the cavity;
    a pump assembly including a piston and cylinder arrangement for drawing the liquid candy into an inlet coupled to the reservoir and causing the liquid candy to flow from an outlet of the pump assembly;
    an aeration device connected to the output of the pump assembly, the aeration device for introducing air into the liquid candy at the outlet of the pump assembly to form an edible foam; and
    a nozzle mounted on the aeration device for dispensing the foam.

14. The candy dispenser as recited in claim 13, wherein the piston and cylinder arrangement includes a first displacement of the piston to draw the liquid candy in the inlet.

15. The candy dispenser as recited in claim 14, wherein a second displacement of the piston forces the liquid candy from the outlet.

16. The candy dispenser as recited in claim 13, further comprising a crank for providing displacement of the pump assembly for causing the liquid candy to flow.

17. The candy dispenser as recited in claim 13, further comprising a finger pump for providing displacement of the pump assembly for causing the liquid candy to flow.

18. The candy dispenser as recited in claim 13, further comprising a flexible reservoir for providing displacement of the pump assembly for causing the liquid candy to flow when a volume of the reservoir is altered.

19. The candy dispenser as recited in claim 13, wherein the aeration device includes a restriction at the outlet.

20. The candy dispenser as recited in claim 19, wherein the restriction includes at least one mesh.

21. The candy dispenser as recited in claim 13, wherein the foaming agent includes at least one of yucca and quillaja.

22. The candy dispenser as recited in claim 13, wherein the liquid candy includes one of a plurality of colors and one of a plurality of flavors.

23. The candy dispenser of claim 13, wherein the liquid candy is provided in solid form and reduced to form the liquid candy.

24. The candy dispenser of claim 13, wherein the liquid candy is maintained at atmospheric pressure.

25. A method for dispensing an edible foam, comprising the steps of:
    providing an edible liquid including a foaming agent in a non-aerosol container in liquid form;
    generating a flow of the edible liquid from the non-aerosol container;
    agitating the edible liquid to form a foam; and
    dispensing the foam to be eaten.

26. The method as recited in claim 25, wherein the step of generating a flow includes the step of pumping the edible liquid through a tube.

27. The method as recited in claim 25, wherein the step of agitating the liquid to form a foam includes the step of flowing the liquid through a mesh to aerate the liquid to form the foam.

28. The method as recited in claim 25, further comprising the step of eating the foam.

29. The method as recited in claim 25, further comprising the step of maintaining the liquid at atmospheric pressure.

30. The method as recited in claim 25, wherein the liquid includes liquid candy.

31. The method as recited in claim 25, wherein the step of providing a liquid including a foaming agent in a container in liquid form includes the step of:
    providing the liquid in a solid form;
    reducing the solid form to a liquid.

* * * * *